(12) United States Patent
Wardlaw

(10) Patent No.: US 8,436,277 B2
(45) Date of Patent: May 7, 2013

(54) AUTOMATIC SHUTOFF SYSTEM AND METHOD FOR WORKSPACE ENCLOSURE ENVIRONMENT

(76) Inventor: Louis J. Wardlaw, Jakarta (ID)

( * ) Notice: Subject to any disclaimer, the term of this patent is extended or adjusted under 35 U.S.C. 154(b) by 416 days.

(21) Appl. No.: 12/660,198

(22) Filed: Feb. 23, 2010

(65) Prior Publication Data

US 2011/0204032 A1    Aug. 25, 2011

(51) Int. Cl.
*B23K 9/10* (2006.01)
(52) U.S. Cl.
USPC ............ 219/130.21; 219/130.01; 340/501; 340/506
(58) Field of Classification Search ............ 219/130.21, 219/130.01; 340/501, 506, 517, 521, 610, 340/632, 679, 680, 686.5
See application file for complete search history.

(56) References Cited

U.S. PATENT DOCUMENTS

| | | | |
|---|---|---|---|
| 5,725,148 A * | 3/1998 | Hartman | 236/49.3 |
| 6,783,054 B1 * | 8/2004 | Pregeant et al. | 228/102 |
| 7,091,848 B2 * | 8/2006 | Albarado | 340/506 |

* cited by examiner

*Primary Examiner* — Toan Le
(74) *Attorney, Agent, or Firm* — Yee & Associates, P.C.

(57) ABSTRACT

An emergency shut off system for a workspace enclosure, wherein a sensor array is provided for detecting hazardous conditions within the workspace enclosure. A control module is coupled to the sensor array. A pneumatic shutoff line is provided, extending between the control module and a hot work apparatus used in connection with the workspace enclosure. The hot work apparatus is responsive to pressurization of the pneumatic shutoff line to remain in an operational state. The control module is responsive to a signal from the sensor array indicating the existence of a hazardous condition inside the workspace enclosure to depressurize the pneumatic shutoff line. The hot work apparatus is responsive to depressurization of the shutoff line to be rendered non-operational.

6 Claims, 1 Drawing Sheet

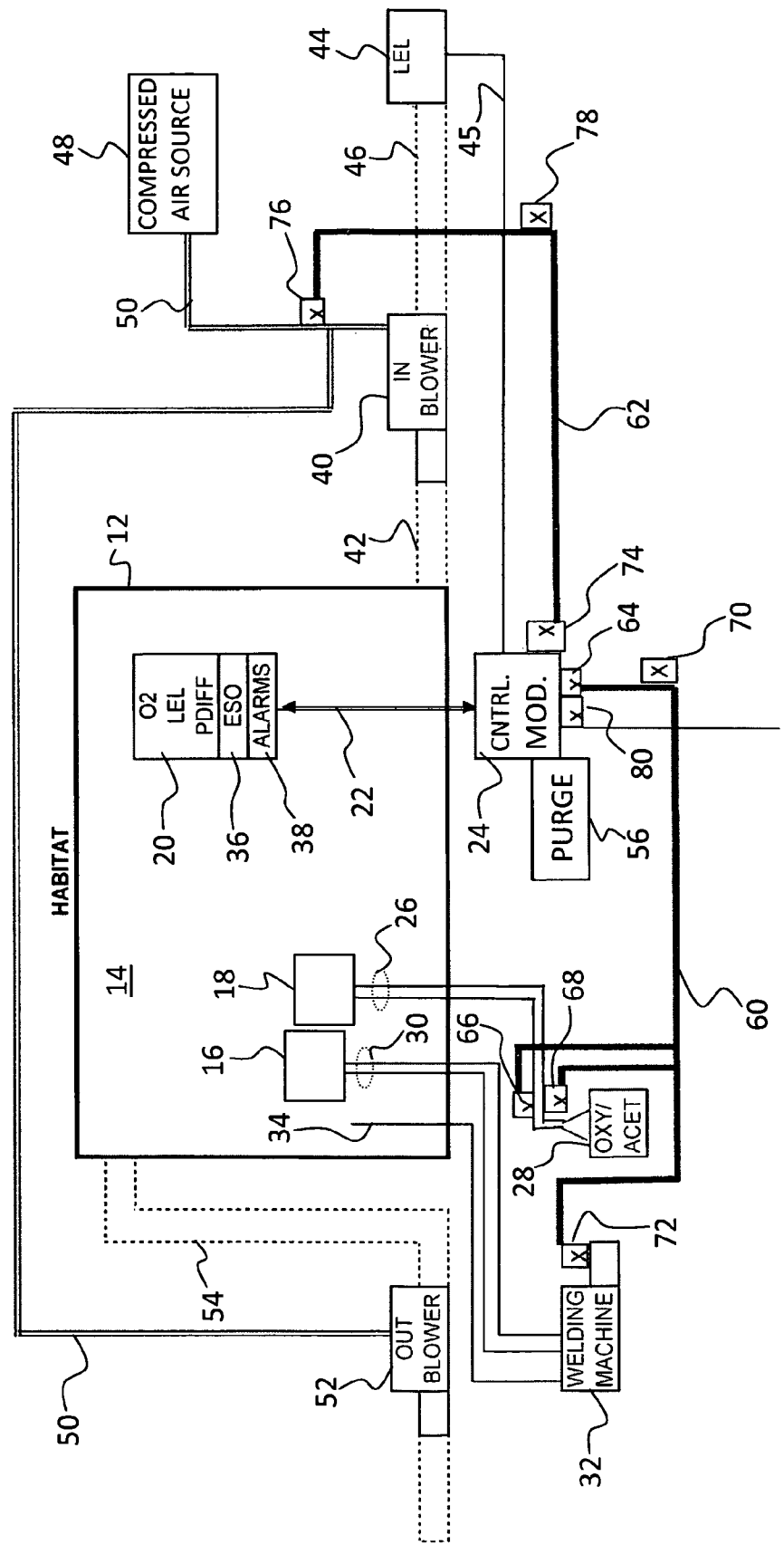

AUTOMATIC SHUTOFF SYSTEM AND METHOD FOR WORKSPACE ENCLOSURE ENVIRONMENT

FIELD OF THE INVENTION

The present invention relates generally to enclosures for working environments, and more particularly relates to a system and methodology for avoiding unsafe conditions in and around such enclosures.

BACKGROUND OF THE INVENTION

There are various settings in which it is necessary or desirable to provide a barrier between a particular working environment and the area surrounding it. Such settings are typically industrial in nature, and a prominent example of such is found on oil and gas drilling facilities, such as offshore platforms, production facilities and the like, in which industrial activities of various sorts regularly occur in close proximity to areas in which the activities would be considered dangerous, or in which the environment in general is not suited to performing certain activities.

In the case of offshore drilling platforms, it is commonly necessary to perform so-called "hot work," such as welding, cutting, grinding, and the like. Hot work can involve the generation of extremely high temperatures, flames and/or electrical arcs, sparks and fragments of materials being sprayed in uncontrolled directions. It is obviously not advisable or desirable for such activities to be performed in close proximity to hydrocarbon liquids and gases, which for the most part are highly combustible.

In recognition of these concerns, there has been proposed in the prior art the concept of an enclosure intended to surround a working area and isolate the working area from potentially hazardous external conditions in close proximity to the working area. Examples of such enclosures are proposed, for example, in U.S. Pat. No. 7,193,501 to Albarado et al. entitled "Enclosure System Allowing for Hot Work Within the Vicinity of Flammable and Combustible Material;" in related U.S. Pat. No. 7,091,848 to Albarado, entitled "Enclosure System for Hot Work Within the Vicinity of Flammable or Combustible Material;" in U.S. Pat. No. 6,783,054 to Pregeant, Jr. et al., entitled "System for Controllably Conducting Welding Operations Adjacent Flammable Materials and Method of Welding Adjacent Flammable Materials;" and in related U.S. Pat. Nos. 5,101,604 and 5,018,321 to Wardlaw, III, each being entitled "Subterranean Well Welding Habitat." Each of the foregoing U.S. Patents is hereby incorporated by reference herein in its respective entirety.

While such work area enclosure systems are known, especially in the oil and gas industry, many implementations do not take into account the potential for the activities or conditions inside the enclosure creating hazardous conditions, such as, for example, if an enclosure contained dangerous concentrations of volatile and/or injurious gases and the like. Such conditions are to be carefully avoided to ensure the safety of persons both inside and outside the working area enclosure.

To address these concerns, there have further been proposed in the art various means for ensuring the safety of persons both within and outside of a workspace enclosure. For example, there has been proposed the provision of sensing devices adapted to signal the presence of combustible or otherwise hazardous conditions within the enclosure. The aforementioned Pregeant, Jr. et al. '054 patent ("Pregeant"), for one, appears to disclose a welding enclosure having one or more sensors for detection of some potentially hazardous condition(s), and for controlling the operations of the welding apparatus in response to signals from the sensor(s).

Notwithstanding the apparent safety benefits arising from the Pregeant disclosure and others in the prior art, there are certain perceived disadvantages to the system proposed in the prior art that make such systems and methods less than optimal in certain respects, and it is believed that there remains an ongoing need for improvements in prior workspace enclosures and the control and safety systems associated with those enclosures.

SUMMARY OF THE INVENTION

In view of the foregoing, the present invention is directed to an automatic shutoff system and method for use with "hot work" being performed in a workspace enclosure. Hot work includes various activities, including cutting, welding, grinding, and other activities prone to creating flames, sparks, embers, extreme temperatures, and the like. Hot work is particularly dangerous in environments in which combustible and flammable materials may be present.

In one embodiment of the invention, a sensor array incorporating at least one sensor is provided within a workspace enclosure. The sensor array is adapted to detect hazardous conditions within the enclosure. Hazardous conditions include extreme pressure differentials inside and outside the enclosure, and/or the presence of dangerous levels of hazardous (e.g., combustible) gases within the enclosure. The sensor array has at least one sensor output for indicating detection of a hazardous condition.

A control module is coupled to the sensor array, and is preferably disposed outside of the workspace enclosure. A pneumatic shutoff line extends from the control module to the hot work apparatus, such as a gas or electric welding system. The pneumatic shutoff line is normally pressurized, thereby actuating valves and the like which keep the hot work apparatus operational. The control module is responsive to a signal from the sensor array indicative of a hazardous condition within the enclosure to depressurize the pneumatic shutoff line. Depressurization of the shutoff line instantly causes the hot work apparatus to be rendered non-operational.

In another embodiment of the invention, an external intake blower delivers positive air pressure to the workspace enclosure. An external sensor is provided in the vicinity of the intake blower to detect hazardous conditions external to the workspace enclosure. The intake blower is coupled to the control module by a pneumatic shutoff line which is normally pressurized. If the external sensor detects a hazardous condition external to the workspace enclosure, it triggers the control module to depressurize the pneumatic shutoff line attached to the intake blower. The intake blower is responsive to depressurization of the pneumatic shutoff line to disable the blower.

The use of pneumatic shutoff lines for controlling operation of equipment associated with a workspace enclosure eliminates the possibility of sparks or short-circuits in the shutoff system, which could themselves create hazardous conditions.

BRIEF DESCRIPTION OF THE DRAWINGS

The foregoing and other features and aspects of the present invention will be best appreciated by reference to a detailed description of the specific embodiments of the invention, when read in conjunction with the accompanying drawings, wherein:

FIG. 1 is a functional block diagram of a workspace enclosure environment incorporating an automatic shutoff system in accordance with one embodiment of the invention.

DETAILED DESCRIPTION OF SPECIFIC EMBODIMENTS OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering practices for the environment in question. It will be appreciated that such a development effort might be complex and time-consuming, but would nevertheless be a routine undertaking for those of ordinary skill in the relevant fields.

Referring to FIG. 1, there is shown a workspace enclosure assembly 10 incorporating an automatic shutoff system in accordance with one embodiment of the invention. Assembly 10 includes a workspace enclosure 12, such as described above. An example of such an enclosure is the Habitat™ Welding Isolation Chamber commercially available from Hot-Hed, Inc., Houston, Tex. The Habitat™ is a portable, inflatable structure specifically designed to facilitate field welding. It is designed to be utilized, among other environments, on off-shore platforms and eliminates the need for costly, time-consuming shut-downs.

As will be apparent to those of ordinary skill in the art, The Habitat™ is adapted for use both with gas-based (e.g., oxy-acetylene) welding/cutting equipment and with electricity-based (e.g. arc-welding) equipment. (Presently, oxy-acetylene equipment predominates the general class of gas-based welding/cutting equipment, and although the term oxy-acetylene is used throughout this disclosure, it will be apparent to those of ordinary skill in the art that the invention is applicable to any type of gas-based system. Similarly, the term arc-welding is used herein as a general term for any form of electricity-based welding systems, such as are well-known in the art.) Those of ordinary skill in the art will appreciate that a gas-based welding/cutting apparatus comprises a cutting/welding torch and a supply of the combustible gases (e.g., oxygen and acetylene tanks), with a hoses for conveying the gases from the supply tanks to the torch. The supply tanks may be located remotely from the torch; for example the tanks may be outside the workspace enclosure while the torch is used inside the enclosure.

Likewise, an arc-welding apparatus comprises a welding machine for generating the welding current and one or more welding electrodes, with cables conducting the welding current from the welding machine to the electrodes. The welding machine, which may be a diesel engine, for example, may be located remotely from the welding electrodes; for example, the welding machine may be outside a workspace enclosure while the welding electrodes are used inside the enclosure.

In a preferred embodiment, the workspace enclosure's flexible (e.g., fabric) walls expand to suit the available space on the platform and isolate a welding area, safely containing the heat-source by maintaining a positive air-pressure within. The positive-pressure system works in the same way as that of the accommodation block on an off-shore platform by creating a virtual air-lock within the enclosure and is maintained by means of continuous air-flow input and extraction, as is known in the art. A ratio on the order of 2:1 input to extraction has been found to be sufficient to ensure that the enclosure is inflated at all times and that the air inside is always clean and free of outside contaminants.

In one embodiment, the enclosure's floor and walls are manufactured from a light-weight, heat-resistant fabric which confines sparks and splatters. Custom-built sleeves adapted to slip easily over pipes and around beams to create a seal are preferably provided.

The enclosure is adapted to be installed around or over a workspace area to be secured and inflated using a blower which applies an air-input of between 700 and 1200 CFM and a positive pressure of between 10 and 20 Pascals. Optionally, an additional exhaust blower provides positive pressure and constant air circulation inside the welding chamber. Such blowers are available as air or electrically-driven units and can be located away from the enclosure itself. In one embodiment, workspace enclosure 102 may be assembled within and held upright by means of an external scaffolding structure or the like, or may have certain key portions of the enclosure tied or otherwise secured to existing structures in the workspace environment.

Enclosure 12 defines an enclosed workspace 14 containing electricity-based welding electrodes 16 and/or a gas-based (e.g., oxy-acetylene) welding/cutting torch 18. Further, enclosure 12 contains a sensor array 20 comprising one or more sensors for detecting hazardous conditions, such as the presence of undesirable gases, or undesirable concentrations of gases, and/or other undesirable conditions within enclosure 12 that would pose a danger to workers in the enclosure. The outputs from sensor array 20 in one embodiment are relatively low-voltage electrical signals that are coupled via lines 22 to a control module 24 situated outside of the enclosure 12, as will hereinafter be described.

In one embodiment, sensor array 20 includes sensors for detecting $O_2$ levels within enclosure 12, levels of so-called lower-explosive-limits (LEL) gases within enclosure 12, and pressure differentials within enclosure 12. Also associated with sensor array 20 may be a manual emergency shutoff switch 36, and a plurality of alarms 38 (audible, visual, or both) for signaling the detection of hazardous conditions within enclosure 12.

Fresh air is introduced into enclosure 12 by an intake blower 40 coupled to enclosure 12 by means of ducts or hoses 42. In one embodiment, another LEL gases sensor 44 is provided at the intake 46 of intake blower 40. Sensor 44 has an output 45 that is applied to control module 24, as shown in FIG. 1. Blower 40 may be powered by means of compressed air from a compressed air source 48 via compressed air hose 50. Likewise, an exhaust blower 52, also powered by compressed air via line 50, is coupled to enclosure 12 by a duct 54 or the like. The relative volumes of air moved by intake blower 40 and exhausts blower 52 are preferably controlled to ensure that positive pressure is maintained within the enclosure at all times, as would be familiar to those of ordinary skill in the art.

In the disclosed embodiment, one welding apparatus comprises a welding/cutting torch 18 that is supplied by oxygen and acetylene lines 26 coupled to gas sources (e.g., canisters) 28 situated outside of enclosure 12. Another welding apparatus comprises welding electrodes 16 that are provided with welding current on lines 30 from a welding machine 32 also disposed outside of enclosure 12. As would be familiar to those of ordinary skill in the art, welding machine 32 customarily comprises a diesel engine/generator. Welding machine 32 may also provide a source of power (e.g., 110 VAC) on line 34 to provide power for other equipment to be used within enclosure 12.

As shown in FIG. 1, control module 24 is preferably disposed outside enclosure 12, and in one embodiment comprises a substantially sealed metal enclosure containing the circuitry and operating logic necessary to achieve the functionality described herein. Preferably, control module 24 has an associated purge system 56 which functions to continuously or periodically purge the interior of control module 24 of any potentially hazardous or combustible gases. Purge system 56 may be a conventional "X-type" system which circulates fresh air into control module 24, or a "Z-type" system which circulates an inert gas such as nitrogen into control module 24.

In accordance with one aspect of the invention, control module 24 is capable of shutting down various components in the vicinity of workspace enclosure 12 upon detection of certain hazardous conditions. This functionality is realized through the provision of a pair of pressurized shutoff lines 60 and 62 coupled between control module 24 and various operational components as shown in FIG. 1.

As shown in the exemplary embodiment of FIG. 1, first pneumatic shutoff line 60 extends from a solenoid dump valve 64 associated with control module 24, to a pair of pneumatic valves 66, 68 associated with oxy-acetylene supply tanks 28 of the gas welding apparatus. In particular, pneumatic valve 66 is in-line with the oxygen supply hose for the welding apparatus, and pneumatic valve 68 is in line with the acetylene supply hose for the welding apparatus. When valves 66 and 68 are closed (as when shutoff line 60 is depressurized), the gas welding apparatus is rendered non-operational, as no gases are delivered to torch 18.

During normal operation (i.e., when no hazardous conditions exist), shutoff line 60 is maintained in a static, pressurized state, being pressurized to, for example, 100 PSI. A pressure fill valve 70 is provided for pressurizing shutoff line 60 from any source of compressed air. The configuration of valves 66 and 68 is such that when shutoff line 60 is pressurized, valves 66 and 68 are actuated to an open state, allowing the combustible gases to be supplied to torch 18 in enclosure 12.

However, control module 24 is responsive to signals on lines 22 from sensor array 20 reflecting detection of a hazardous condition within enclosure 12 to actuate dump valve 64, instantly depressurizing shutoff line 60. The depressurization of line 60 actuates valves 66 and 68 to their closed states, cutting off the supply of combustible gases to torch 18.

With continued reference to FIG. 1, a similar arrangement is implemented with pneumatic shutoff line 60 being attached to a pneumatic valve 72 associated with welding machine 32. In one embodiment, valve 72 is a butterfly valve connected to the air intake of welding machine 32, and valve 72 is held open by the pressurization of shutoff line 60. When shutoff line 60 is depressurized as described above in response to detection of a hazardous condition in enclosure 12, this depressurization actuates valve 72 to its closed position, thereby choking off the air intake of welding machine 32 and thereby rendering welding machine 32 inoperative.

A second pneumatic shutoff line 62 is coupled between a second solenoid dump valve 74 associated with control module 24 and a pneumatic gate valve 76 in the compressed air supply line 50 from compressed air source 48. In accordance with one aspect of the invention, when a hazardous condition inside enclosure 12 is detected by sensor array 20, it is desirable that intake blower 40 and exhaust blower 52 continue to operate, in order to evacuate any hazardous gases from enclosure 12 (or to maintain the desired pressure within enclosure 12). However, if hazardous LEL gases are detected outside enclosure 12, it is deemed desirable to disable blowers 40 and 52 in order to avoid introducing these gases into the enclosure 12. Accordingly, control module 24 is responsive to output signal 45 from LEL gas sensor 44 indicating the presence of LEL gases outside the enclosure 12 to actuate dump valve 74. Shutoff line 62 is normally pressurized (using fill valve 78) keeping pneumatic valve 76 actuated to its open state, allowing compressed air from source 48 to drive blowers 40 and 52. When control module 24 actuates dump valve 74, shutoff line 62 is instantly depressurized, actuating valve 76 to its closed state, thereby disabling blowers 40 and 52.

From the foregoing description, it should be apparent that a system and method for automatic shutoff of hot work equipment in the vicinity of a workspace enclosure has been provided. In one embodiment, the system is adapted to control the operation of a gas or electric welding apparatus, which may be partially outside the enclosure (e.g., gas canisters, welding machine) and partially inside the enclosure (e.g., cutting/welding torch, welding electrodes). An advantage arises out of the use of pneumatic shutoff lines to control operation of the hot work apparatus. Such a shutoff line may be further used to independently control operation of an intake blower (and exhaust blower) for the enclosure in response to detection of hazardous conditions external to the workspace enclosure.

Thus, the illustrative embodiments provide for an emergency shut off system for a workspace enclosure, wherein a sensor array is provided for detecting hazardous conditions within the workspace enclosure. A control module is coupled to the sensor array. A pneumatic shutoff line is provided, extending between the control module and a hot work apparatus used in connection with the workspace enclosure. The hot work apparatus is responsive to pressurization of the pneumatic shutoff line to remain in an operational state. The control module is responsive to a signal from the sensor array indicating the existence of a hazardous condition inside the workspace enclosure to depressurize the pneumatic shutoff line. The hot work apparatus is responsive to depressurization of the shutoff line to be rendered non-operational. In one embodiment, an external sensor is provided for detecting a hazardous condition outside of the workspace enclosure. A second pneumatic shutoff line is provided between the control module and an intake blower for the workspace enclosure. The intake blower is responsive to pressurization of the second shutoff line to remain operational. In response to detection of an external hazardous condition, the external sensor triggers the control module to depressurize the second pneumatic shutoff line. The intake blower is responsive to depressurization of the second pneumatic shutoff line to be rendered non-operational.

Although specific embodiments and variants of the invention have been described herein in some detail, it is to be understood that this has been done solely for the purposes of illustrating various features and aspects of the invention, and is not intended to be limiting with respect to the scope of the invention, as defined in the claims. It is contemplated and to be understood that various substitutions, alterations, and/or modifications, including such implementation variants and options as may have been specifically noted or suggested herein, may be made to the disclosed embodiment of the invention without departing from the spirit or scope of the invention.

What is claimed is:
1. A system comprising:
an enclosure;
a welding apparatus disposed inside the enclosure, the welding apparatus comprising a torch, an oxygen line configured to convey oxygen to the torch, and an acetylene line configured to convey acetylene to the torch;

an oxygen tank disposed outside of the enclosure and connected to the oxygen line;

an acetylene tank disposed outside of the enclosure and connected to the acetylene line;

an intake blower connected to the enclosure, and configured to blow air into the enclosure;

an exhaust blower connected to the enclosure, and configured to blow air out of the enclosure;

a sensor array comprising at least one sensor, disposed in said enclosure, the sensor array configured to detect a first hazardous condition in said enclosure, and further configured, responsive to detecting the first hazardous condition, to assert a first sensor output signal;

a first pneumatic valve connected, outside of the enclosure, to the oxygen line and configured such that actuation of the first pneumatic valve will cause a first flow of oxygen to cease in the oxygen line;

a second pneumatic valve connected, outside of the enclosure, to the acetylene line and configured such that actuation of the second pneumatic valve will cause a second flow of acetylene to cease in the acetylene line;

a solenoid dump valve, disposed outside of the enclosure, in fluid communication with the first pneumatic valve and the second pneumatic valve via a first pneumatic shutoff line, wherein the first pneumatic valve and the second pneumatic valve are configured to actuate upon actuation of the solenoid dump valve; and a control module, disposed outside of the enclosure, and coupled to said sensor array, the control module further connected to the solenoid dump valve via the first pneumatic shutoff line, the control module configured to receive the first sensor output signal and, responsive to receiving the first sensor output signal, cause the solenoid dump valve to pneumatically actuate.

2. An automatic shutdown system in accordance with claim 1, further comprising:

an external sensor, coupled to said control module and disposed outside of said enclosure, for asserting a second sensor output signal in response to detection of a second hazardous condition outside of said enclosure;

a second pneumatic shutoff line, coupled between said control module and said intake and exhaust blowers, said intake and exhaust blowers being responsive to pressurization of said second pneumatic shutoff line to remain operational and being responsive to depressurization of said second pneumatic shutoff line to become non-operational;

wherein said control module is responsive to assertion of said second sensor output signal to depressurize said second pneumatic shutoff line.

3. An automatic shutdown system in accordance with claim 2, wherein said external sensor is disposed at an air intake of said intake blower.

4. A method implemented in a system including an enclosure; a welding apparatus disposed inside the enclosure, the welding apparatus comprising a torch, an oxygen line configured to convey oxygen to the torch, and an acetylene line configured to convey acetylene to the torch; an oxygen tank disposed outside of the enclosure and connected to the oxygen line; an acetylene tank disposed outside of the enclosure and connected to the acetylene line; an intake blower connected to the enclosure, and configured to blow air into the enclosure; an exhaust blower connected to the enclosure, and configured to blow air out of the enclosure; a sensor array comprising at least one sensor, disposed in said enclosure, the sensor array configured to detect a first hazardous condition in said enclosure, and further configured, responsive to detecting the first hazardous condition, to assert a first sensor output signal; a first pneumatic valve connected, outside of the enclosure, to the oxygen line and configured such that actuation of the first pneumatic valve will cause a first flow of oxygen to cease in the oxygen line; a second pneumatic valve connected, outside of the enclosure, to the acetylene line and configured such that actuation of the second pneumatic valve will cause a second flow of acetylene to cease in the acetylene line; a solenoid dump valve, disposed outside of the enclosure, in fluid communication with the first pneumatic valve and the second pneumatic valve via a first pneumatic shutoff line, wherein the first pneumatic valve and the second pneumatic valve are configured to actuate upon actuation of the solenoid dump valve; and a control module, disposed outside of the enclosure, and coupled to said sensor array, the control module further connected to the solenoid dump valve via the first pneumatic shutoff line, the control module configured to receive the first sensor output signal and, responsive to receiving the first sensor output signal, cause the solenoid dump valve to pneumatically actuate, the method comprising:

detecting, using the sensor array, the first hazardous condition;

responsive to detecting, transmitting the first sensor output signal from the sensor array to the control module;

responsive to receiving the first sensor output signal at the control module, the control module causing the solenoid dump valve to pneumatically actuate;

responsive to pneumatically actuating the solenoid dump valve, pneumatically actuating the first pneumatic valve and also the second pneumatic valve, wherein pneumatically actuating the solenoid dump valve causes the first pneumatic valve and the second pneumatic valve both to actuate, wherein pneumatically actuating the first pneumatic valve causes the first flow to cease, and wherein pneumatically actuating the second pneumatic valve causes the second flow to cease.

5. The method of claim 4, wherein the system further includes an external sensor, coupled to said control module and disposed outside of said enclosure, for asserting a second sensor output signal in response to detection of a second hazardous condition outside of said enclosure; a second pneumatic shutoff line, coupled between said control module and said intake and exhaust blowers, said intake and exhaust blowers being responsive to pressurization of said second pneumatic shutoff line to remain operational and being responsive to depressurization of said second pneumatic shutoff line to become non-operational; wherein said control module is responsive to assertion of said second sensor output signal to depressurize said second pneumatic shutoff line, and wherein the method further comprises:

detecting, using the external sensor, the second hazardous condition;

responsive to detecting, transmitting a second sensor output signal from the external sensor to the control module;

responsive to receiving the second sensor output signal at the control module, the control module causing the second pneumatic shutoff line to depressurize and thereby cause the intake and exhaust blowers to become non-operational.

6. The method of claim 5, wherein said external sensor is disposed at an air intake of said intake blower.

* * * * *